United States Patent
Sasao et al.

(10) Patent No.: US 7,431,982 B2
(45) Date of Patent: Oct. 7, 2008

(54) CUSHION SHEET AND MANUFACTURING METHOD FOR A CUSHION SHEET

(75) Inventors: Takuhiro Sasao, Aichi (JP); Tunenori Oguri, Gifu-ken (JP); Noriyoshi Takami, Gifu-ken (JP)

(73) Assignee: Inoac Corporation, Nagoya-Shi, Aichi (JP)

( * ) Notice: Subject to any disclaimer, the term of this patent is extended or adjusted under 35 U.S.C. 154(b) by 174 days.

(21) Appl. No.: 11/353,751

(22) Filed: Feb. 14, 2006

(65) Prior Publication Data

US 2006/0189242 A1 Aug. 24, 2006

(30) Foreign Application Priority Data

Feb. 22, 2005 (JP) .............................. 2005-045957

(51) Int. Cl.
*B32B 3/06* (2006.01)
*B32B 5/26* (2006.01)

(52) U.S. Cl. .................. 428/316.6; 442/62; 442/97; 442/381; 442/394; 442/409; 428/103; 428/304.4; 428/306.6

(58) Field of Classification Search .......... 442/62, 442/97, 381, 394, 409; 428/103, 316.6, 304.4, 428/306.6
See application file for complete search history.

(56) References Cited

U.S. PATENT DOCUMENTS

| | | | |
|---|---|---|---|
| 3,654,063 A | 4/1972 | Blackburn et al. | |
| 5,750,246 A | 5/1998 | Yuasa et al. | |
| 5,750,444 A * | 5/1998 | Jarrell et al. | ........... 442/62 |
| 2002/0155255 A1 | 10/2002 | Oguri et al. | |
| 2005/0064777 A1 | 3/2005 | Stewart | |

FOREIGN PATENT DOCUMENTS

| | | | |
|---|---|---|---|
| JP | 06-182067 | * | 7/1994 |
| JP | 2000-107471 | * | 4/2000 |
| JP | 2000-045957 | | 2/2005 |

* cited by examiner

*Primary Examiner*—Norca Torres-Velazquez
(74) *Attorney, Agent, or Firm*—Colin P. Cahoon; Carstens & Cahoon, LLP

(57) ABSTRACT

A cushion sheet has a sheet body and a low-friction layer formed on the sheet body. The low-friction layer is formed by a plurality of synthetic resin fibers. The synthetic resin fibers are bonded with a surface of the sheet body in a state resembling a spread cloth. It is preferred that the diameter of each of the synthetic resin fibers be set in a range of 10 to 600 micrometers. It is also preferred that the amount of the synthetic resin fibers bonded with the surface of the sheet body be set in a range of 5 to 100 grams per square meter of the sheet body.

8 Claims, 4 Drawing Sheets

CUSHION SHEET AND MANUFACTURING METHOD FOR A CUSHION SHEET

BACKGROUND OF THE INVENTION

The present invention relates to cushion sheets used in, for example, seat covers that cover seats of vehicles, and manufacturing methods for the cushion sheets.

Conventionally, a seat cover 31 as in FIG. 6 having three layers, for example, is used as a seat cover for covering a seat of a vehicle. More specifically, the seat cover 31 includes a fibrous sheet 32, a cushion sheet 33 bonded with the backside of the fibrous sheet 32, and a back lining 34 bonded with the backside of the cushion sheet 33. The fibrous sheet 32 is formed by, for example, a fabric or a vinyl chloride sheet. The cushion sheet 33 is formed of, for example, soft urethane foam. The back lining 34 is formed of, for example tricot or unwoven fabric.

The back lining 34 improves the smoothness of the backside of the cushion sheet 33, thus making it easy to sew the seat cover 31 and install the seat cover 31 in the cushion body of the seat of the vehicle.

However, for forming the seat cover 31, the back lining 34 is bonded with the entire backside of the cushion sheet 33 through, for example, frame laminating. This decreases the air permeability of the seat cover 31. Further, the fibrous sheet 32 and the cushion sheet 33 exhibit a different extension rate than the extension rate of the back lining 34. Thus, when the seat cover 31 is secured to the cushion body, wrinkles tend to be caused in the seat cover 31. Also, the frame laminating for bonding the back lining 34 with the backside of the cushion sheet 33 increases the steps for manufacturing the cushion sheet 33, complicating the manufacture of the cushion sheet 33. The cost for manufacturing the cushion sheet 33 is thus raised.

To solve these problems, for example, Japanese Laid-Open Patent Publication No. 2000-107471 proposes a cushion sheet 35, which is shown in FIG. 7. The cushion sheet 35, referring to the drawing, includes an air-permeable sheet material 36. A plurality of adhesive layers 38, or dots of adhesive, are formed on the backside of the air-permeable sheet material 36. The adhesive layers 38 are provided by applying hot-melt adhesives 37 on the backside of the air-permeable sheet material 36 in accordance with a dotted pattern. More specifically, the hot-melt adhesives 37 are extruded through a T die in a molten state and applied on the backside of the air-permeable sheet material 36 in such a manner as to form a prescribed pattern. This provides the adhesive layers 38 that are arranged in accordance with the dotted pattern. This ensures the air permeability of the cushion sheet 35 and the smoothness of the cushion sheet 35 that is comparable with that of the back lining 34 of the seat cover 31 of FIG. 6.

To form the cushion sheet 35, the adhesive layers 38 must be arranged in accordance with the prescribed dotted pattern. The speed for applying the hot-melt adhesives 37 is thus restricted to a certain level. If such speed is excessively increased, the dots cannot be arranged in a desired manner. This makes it impossible to ensure a necessary smoothness of the cushion sheet 35, hampering sewing of the seat cover 31.

Each dot of the dotted pattern, which is formed on the air-permeable sheet material 36 by the hot-melt adhesives 37, focally contains a relatively great amount of adhesive. This causes the adhesives 37 to permeate through the air-permeable sheet material 36. In this state, the hot-melt adhesives 37 do not contribute to improvement of the smoothness of the backside of the cushion sheet 35. If the quantity of such adhesives 37 increases, an increased amount of adhesive becomes necessary for forming the adhesive layers 38. This increases the manufacturing cost of the cushion sheet 35. Further, permeation of the hot-melt adhesives 37 hardens the air-permeable sheet material 36. This degrades the feel of the cushion sheet 35 and lowers the air permeability of the cushion sheet 35.

SUMMARY OF THE INVENTION

Accordingly, it is an objective of the present invention to provide a cushion sheet that can be manufactured quickly and thus improves productivity and has increased smoothness, improved feel, and enhanced air-permeability, and a manufacturing method for the cushion sheet.

To achieve the foregoing and other objectives and in accordance with the purpose of the present invention, a cushion sheet having a sheet body and a low-friction layer formed on the sheet body is provided. The low-friction layer is formed by a plurality of synthetic resin fibers. The synthetic resin fibers are bonded with a surface of the sheet body in a state resembling a spread cloth.

The present invention also provides a method for manufacturing a cushion sheet having a sheet body and a low-friction layer formed on the sheet body. The low-friction layer is formed by a plurality of synthetic resin fibers, and the synthetic resin fibers are bonded with a surface of the sheet body in a state resembling a spread cloth. The method includes: preparing the sheet body and a molten synthetic resin material for the fibers; and forming the low-friction layer by bonding the molten synthetic resin material with the surface of the sheet body such that the synthetic resin fibers in a state resembling a spread cloth are formed on the surface of the sheet body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
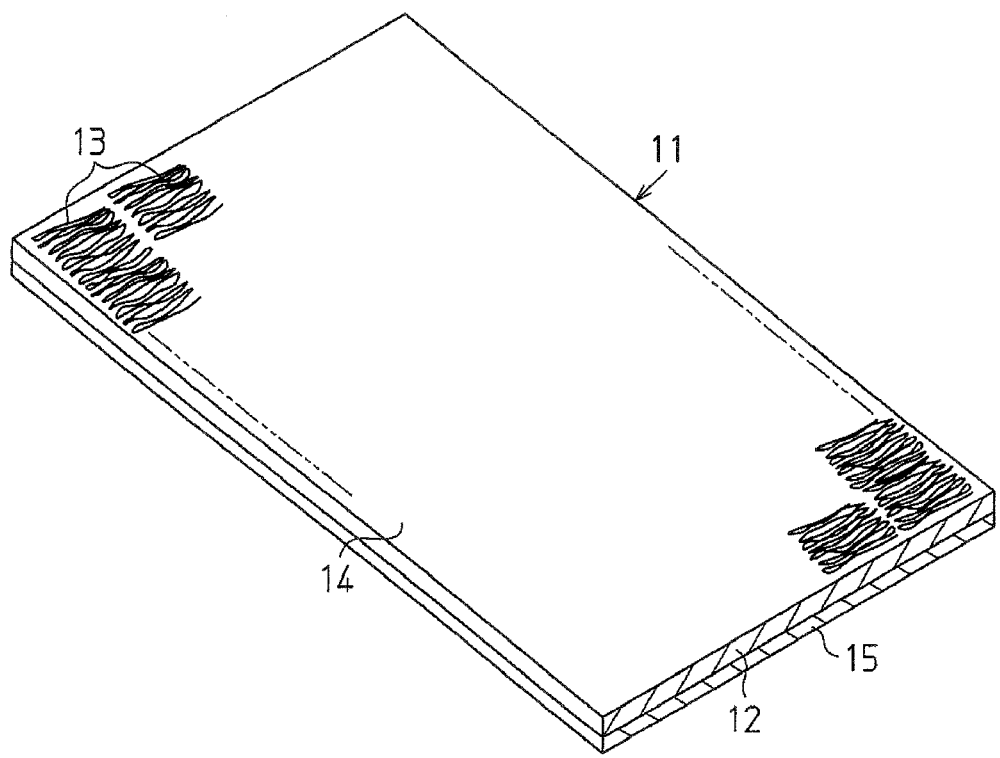
FIG. 1 is a perspective view showing a main portion of a cushion sheet according to an embodiment of the present invention.

A cushion sheet according to an embodiment of the present invention will now be described with reference to FIGS. 1 to 5. As shown in FIG. 1, a cushion sheet 11 has a sheet body 12

(for example, a product of INOAC CORPORATION, product number: EL-67F, thickness: 1.5 to 4 millimeters) and a low-friction layer 14. The low-friction layer 14 is formed on a side surface of the sheet body 12. The sheet body 12 is formed of a porous material and has a predetermined thickness. The porous material may be flexible polyurethane foam. The low-friction layer 14 has a friction coefficient lower than that of a conventional similar layer. The low-friction layer 14 is formed by bonding a plurality of synthetic resin fibers 13 with the side surface of the sheet body 12 in a non-uniform and continuously extended and curved manner. The synthetic resin fibers 13 are arranged on the sheet body 12 with clearances between adjacent ones of the synthetic resin fibers 13 and in a state resembling a spread cloth. Accordingly, the surface of the sheet body 12 is exposed between the synthetic resin fibers 13.

The synthetic resin fibers 13 are formed of a resin that hardens through reaction with moisture in the air, which is a moisture curing resin. The moisture curing resin may be a polyurethane hot-melt moisture curing resin (which is, for example, a polyurethane hot-melt moisture curing resin: diphenyl methane diisocyanate of HITACHI KASEI POLYMER CO., LTD., type MDI, product number: YR067).

The diameter of each synthetic resin fiber 13 is preferably 10 to 600 micrometers, more preferably 13 to 400 micrometers, and further preferably 15 to 400 micrometers. If the diameter of each synthetic resin fiber 13 is less than 10 micrometers, the thickness of the low-friction layer 14 becomes insufficient. This decreases the surface smoothness of the cushion sheet 11. If the diameter of each synthetic resin fiber 13 is greater than 600 micrometers, the thickness of the low-friction layer 14 becomes excessively great or the amount of the material of the synthetic resin fibers 13 permeating through the sheet body 12 increases. This degrades the feel of the cushion sheet 11 and decreases the air permeability of the cushion sheet 11.

The amount of the synthetic resin fibers 13 bonded with the surface of the sheet body 12 per square meter of the sheet body 12 is preferably 5 to 100 grams and more preferably 10 to 40 grams. If such amount is less than 5 grams, the density of the low-friction layer 14 becomes insufficient and the surface smoothness of the cushion sheet 11 is thus decreased. If the amount exceeds 100 grams, the density of the low-friction layer 14 becomes excessively high, thus decreasing the air permeability of the cushion sheet 11.

A manufacturing apparatus for the cushion sheet 11 will hereafter be explained.

Figure 3:
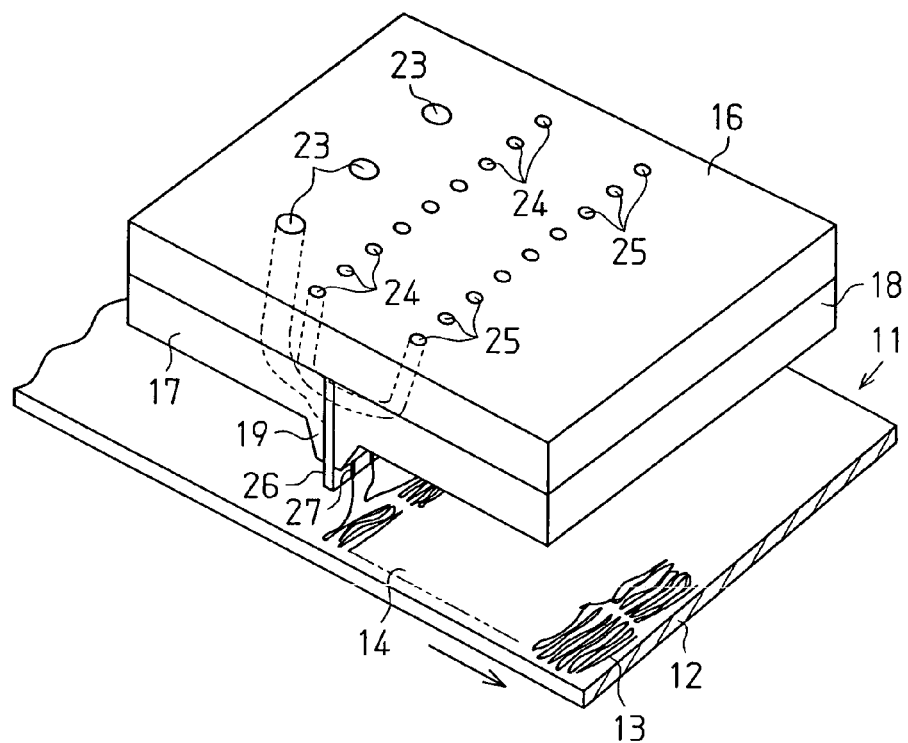
FIG. 3 is a perspective view showing a manufacturing apparatus for the cushion sheet.
Figure 4:
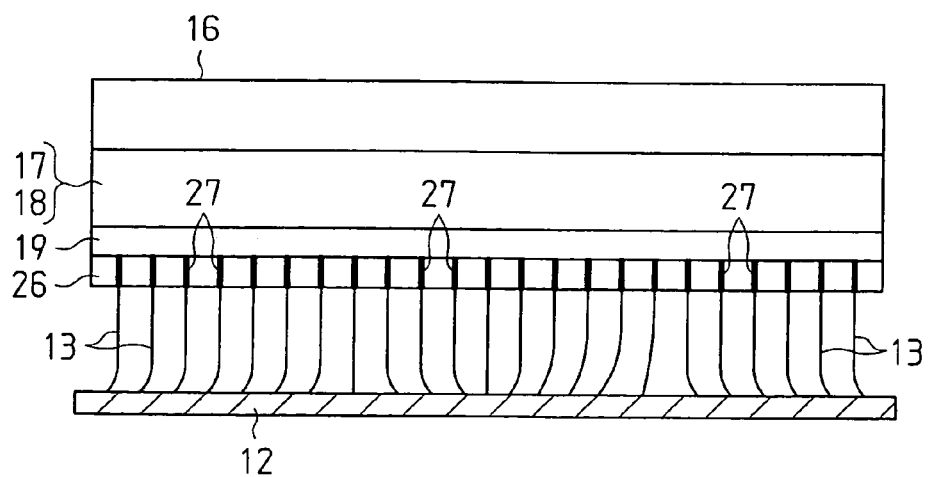
FIG. 4 is a side view showing a main portion of the manufacturing apparatus.
Figure 5:
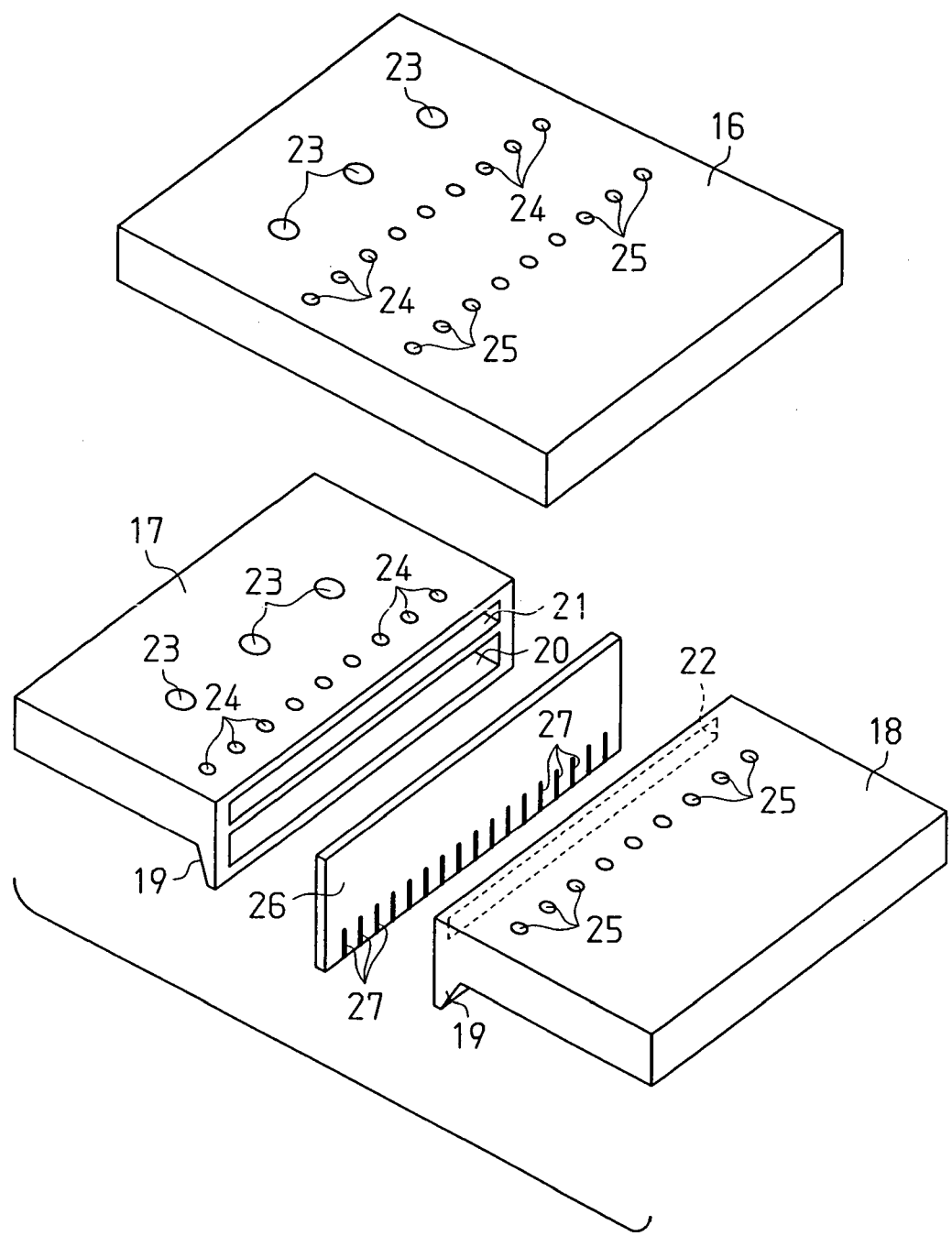
FIG. 5 is an exploded perspective view showing the manufacturing apparatus.
Figure 6:
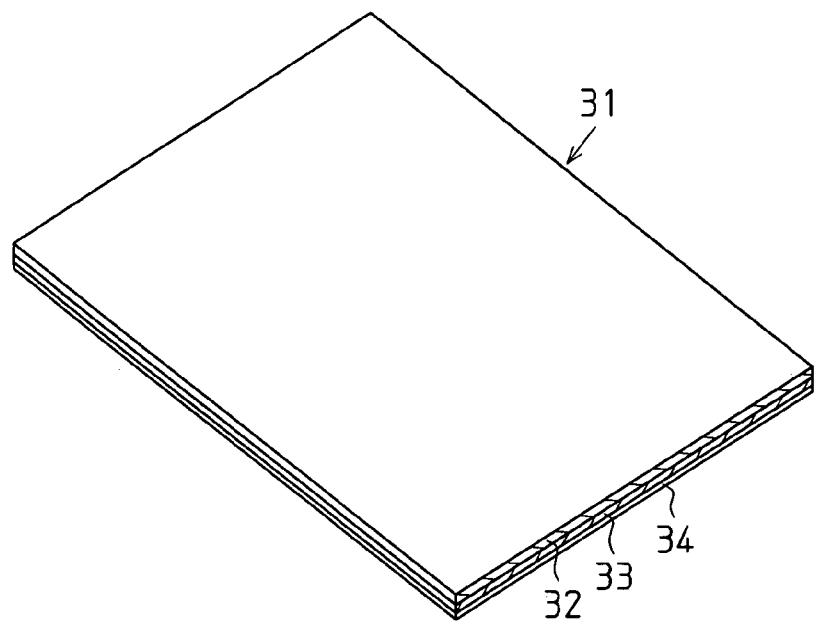
FIG. 6 is a perspective view showing a main portion of a conventional seat cover.
Figure 7:
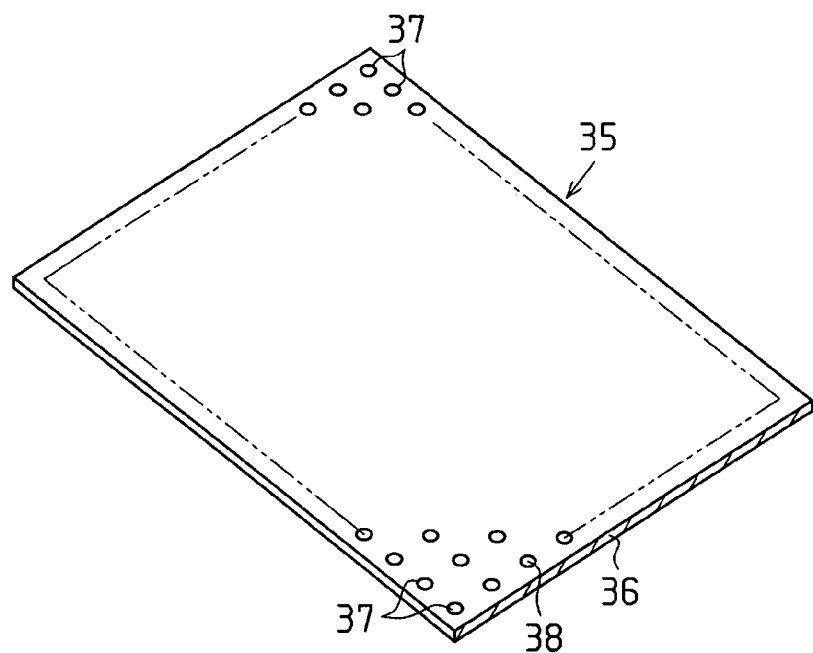
FIG. 7 is a perspective view showing a main portion of a conventional cushion sheet.

As shown in FIGS. 3 to 5, the apparatus includes a pair of spinneret plates 17, 18 that are bonded with a lower surface of a support plate 16 and spaced at a predetermined distance. The spinneret plates 17, 18 have mutually opposing ends each defining a spinneret 19. Further, the spinneret plate 17 includes an air inlet chamber 21 and the spinneret plate 18 includes an air inlet chamber 22. Each of the air inlet chambers 21, 22 is defined in a surface of the associated one of the spinneret plate 17, 18 that opposes the other spinneret plate 17, 18. The spinneret plate 17 also includes a resin supply chamber 20 defined in the surface of the spinneret plate 17 that opposes the spinneret plate 18. A plurality of resin introduction holes 23 extend through the support plate 16 and the spinneret plate 18 and thus communicate with the resin supply chamber 20. A plurality of air introduction holes 24 extend through the support plate 16 and the spinneret plate 17 and thus communicate with the air inlet chamber 21. Likewise, a plurality of air introduction holes 25 extend through the support plate 16 and the spinneret plate 18 and thus communicate with the air inlet chamber 22.

A nozzle plate 26 is arranged between the spinnerets 19. A plurality of nozzle holes 27, which are elongated grooves that extend vertically, are defined in the nozzle plate 26 and spaced at predetermined intervals. Each of the nozzle holes 27 corresponds to the resin supply chamber 20 and the air inlet chambers 21, 22. The lateral dimension of each nozzle hole 27 is, for example, approximately 0.4 millimeters.

In order to form the low-friction layer 14 on a surface of the sheet body 12 using the apparatus, the sheet body 12 is arranged at a position spaced from the spinnerets 19 by a predetermined distance as shown in FIGS. 3 and 4. The sheet body 12 is then moved in a direction perpendicular to the direction in which the nozzle holes 27 are arranged. In this state, molten synthetic resin material is supplied to the resin introduction holes 23 via a non-illustrated path. The material is then introduced into the resin supply chamber 20 through the resin introduction holes 23. The material is thus extruded from the nozzle holes 27 onto the opposing surface of the sheet body 12.

At this stage, the air that has been introduced into the air inlet chambers 21, 22 through the associated air introduction holes 24, 25 is ejected onto the surface of the sheet body 12 through the nozzle holes 27 together with the molten synthetic resin material. In this manner, the synthetic resin material is extended in an elongated shape corresponding to fibers having a predetermined diameter, thus forming the synthetic resin fibers 13. Further, since the air is ejected as turbulent flow, the synthetic resin fibers 13 swing randomly. This causes the synthetic resin fibers 13 to be bonded with the surface of the sheet body 12 in a non-uniform and continuously extended and curved manner and in a state resembling a spread cloth. The synthetic resin fibers 13 then harden and thus provide the low-friction layer 14 on the surface of the sheet body 12.

In the illustrated embodiment, the synthetic resin fibers 13 are provided on the sheet body 12 in a non-uniform manner. Therefore, if the sheet body 12 is moved quickly and the machining speed is increased, undesired arrangement of the synthetic resin fibers 13 can be suppressed, unlike the prior art, by correspondingly increasing the speed for extruding the synthetic resin fibers 13.

As has been described, the synthetic resin fibers 13 are formed of the moisture curing resin and the spinnerets 19 of the manufacturing apparatus are spaced from the sheet body 12.

The synthetic resin fibers 13 are bonded with the sheet body 12 in a semi-cured state. This suppresses permeation of the material of the synthetic resin fibers 13 through the sheet body 12.

Figure 2:
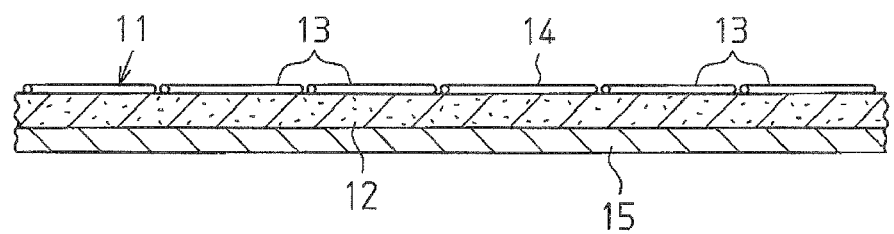
FIG. 2 is an enlarged cross-sectional view showing the cushion sheet.

To use the cushion sheet 11 as a seat cover for a seat of a vehicle, as shown in FIGS. 1 and 2, the surface of the sheet body 12 opposed to the surface corresponding to the low-friction layer 14 is covered by a fibrous sheet 15 formed by, for example, a fabric or vinyl polychloride sheet. The fibrous sheet 15 may be bonded with the surface of the sheet body 12 by adhesive. Although such bonding may generate heat, reactivation (re-melting) of the material of the synthetic resin fibers 13 is suppressed since the synthetic resin fibers 13 are formed of the moisture curing resin.

Accordingly, by providing the low-friction layer 14 formed of fibrous synthetic resin on the surface of the cushion sheet 11, the surface smoothness of the cushion sheet 11 is improved. As a result, the cushion sheet 11 can be handled efficiently, for example, after sewing of the cushion sheet 11 is completed.

Further, clearances are defined between adjacent ones of the synthetic resin fibers 13, which form the low-friction layer 14. This enhances the air permeability of the cushion sheet 11 and improves the feel of the cushion sheet 11. The cushion sheet 11 thus can be used comfortably for covering a vehicle seat.

The low-friction layer 14 formed on the sheet body 12 makes it unnecessary to provide a back lining unlike the prior art. This decreases the quantity of components of the cushion sheet 11. Also, unlike the back lining of the prior art, the low-friction layer 14 substantially maintains elasticity of the sheet body 12. This suppresses generation of wrinkles on the sheet body 12 and on an exposed surface of the seat cover located above the sheet body 12.

In the manufacture of the cushion sheet 11, the low-friction layer 14 is formed on the surface of the sheet body 12 by providing the synthetic resin fibers 13. The synthetic resin fibers 13 are bonded with the surface of the sheet body 12 in the non-uniform manner and in a state resembling a spread cloth. This increases the manufacturing speed and thus improves productivity unlike the prior art in which the dot-like adhesive layers are arranged on the surface of the air-permeable sheet material in accordance with the predetermined pattern.

Further, the manufacturing apparatus may be deployed in a slicing step of the sheet body 12 in which the sheet body 12 is sliced to a predetermined thickness. In this manner, such slicing and formation of the low-friction layer 14 can be performed successively. This greatly improves the productivity and suppresses enlargement of the production facility.

In the manufacture of the cushion sheet 11, the molten synthetic resin material is extruded together with the air flow through the nozzle holes 27, which are spaced from the sheet body 12. The synthetic resin fibers 13 are thus bonded with the entire surface of the sheet body 12 in a state resembling a spread cloth. In this manner, the synthetic resin fibers 13 are provided uniformly on the entire surface of the sheet body 12 with increased efficiency.

Further, by providing the synthetic resin material as fibers each having a predetermined diameter, the ratio of the surface area relative to the volume of the material is increased. The synthetic resin fibers 13 are thus deployed on the surface of the sheet body 12 in a semi-cured state. This substantially prevents the material of the synthetic resin fibers 13 from penetrating through the sheet body 12. The amount of the material for forming the synthetic resin fibers 13 is thus reduced. The feel and the air permeability of the cushion sheet 11 are also maintained by suppressing penetration of the material of the synthetic resin fibers 13 through the sheet body 12. Accordingly, the cushion sheet 11 has improved feel, enhanced air permeability, and increased smoothness.

The illustrated embodiment has the following advantages.

Since the increased smoothness of the sheet body 12 is ensured, for example, the sewing efficiency of the sheet body 12 is increased. The air permeability and the feel of the cushion sheet 11 are also improved reliably.

Since the back lining becomes unnecessary for forming the cushion sheet 11, the quantity of components of the cushion sheet 11 decreases.

Formation of wrinkles on the surface of the cushion sheet 11 is suppressed, thus improving the appearance of the cushion sheet 11.

Unlike the prior art in which the dot-like adhesive layers are applied in accordance with the predetermined pattern, the cushion sheet 11 of the illustrated embodiment is formed quickly. This increases productivity for the cushion sheet 11 and thus lowers the cost for manufacturing the cushion sheet 11.

The material of the synthetic resin fibers 13 are substantially prevented from penetrating through the sheet body 12. This reduces the amount of the material for forming the synthetic resin fibers 13 and thus the cost for manufacturing the cushion sheet 11. Further, the cushion sheet 11 with improved feel, enhanced air permeability, and increased smoothness is provided.

The sheet body 12 is formed of the porous material. Since the porous material has improved feel and increased air permeability, the feel and the air permeability of the cushion sheet 11 are improved.

The diameter of each synthetic resin fiber 13 is set in the above-described range. This suppresses the penetration of the material of the synthetic resin fibers 13 through the sheet body 12. The synthetic resin fibers 13 are thus reliably provided on the surface of the sheet body 12 in a state resembling a spread cloth.

The amount of the material of the synthetic resin fibers 13 bonded with the sheet body 12 is set in the above-described range. This increases the smoothness of the cushion sheet 11 while ensuring the increased air permeability of the cushion sheet 11.

The synthetic resin fibers 13 are provided on the sheet body 12, and are extended and curved in a non-uniform manner. This makes it significantly easy to form the low-friction layer 14.

When extruded through the nozzle holes 27 for forming the cushion sheet 11, the synthetic resin fibers 13 swing. This causes the synthetic resin fibers 13 to be bonded with the surface of the sheet body 12, and extended and curved in the non-uniform manner.

The illustrated embodiment may be modified as follows.

In the illustrated embodiment, each of the synthetic resin fibers 13 is disposed on the sheet body 12 as a continuous body. However, instead of this, the synthetic resin fibers 13 may be provided on the sheet body 12, while being separated in sections each having a predetermined length.

The synthetic resin fibers 13 may be bonded with the sheet body 12 in accordance with a uniform pattern. For example, the synthetic resin fibers 13 may be provided in a grid-like or striped or spiral shape. In this case, regardless of the moving speed of the sheet body 12, the synthetic resin fibers 13 are reliably formed on the sheet body 12 by-increasing the supply amount of the material for forming the synthetic resin fibers 13.

The synthetic resin fibers 13 may be formed through spraying. More specifically, the molten synthetic resin material for forming the synthetic resin fibers 13 may be sprayed onto the surface of the sheet body 12. In this manner, multiple synthetic resin fibers 13 each having a decreased length are applied on the surface of the sheet body 12.

The synthetic resin fibers 13 may be formed of a thermosetting resin. In this case, the material of the synthetic resin fibers 13 is supplied to the surface of the sheet body 12 in a heated atmosphere. The synthetic resin fibers 13 are thus cured by the heat.

The synthetic resin fibers 13 may be formed of an ultraviolet curing resin. In this case, it is preferred that an ultraviolet radiation device be arranged with respect to the material of the synthetic resin fibers 13, which is provided through the nozzle holes 27.

The cushion sheet 11 may be used for different purposes other than the seat cover for the vehicle seat. That is, the cushion sheet 11 may be used in protection casings for accommodating precision devices such as cameras and microscopes.

As long as the synthetic resin fibers 13 are not subjected to heating after shaping, the synthetic resin fibers 13 may be formed of a non-reactive thermoplastic resin that does not react to moisture (for example, product number #9618 of HITACHI KASEI POLYMER CO., LTD.).

This makes it unnecessary to perform complicated work for maintaining the manufacturing facility, such as blockage of the air when ending the operation of the facility and replacement of a washing agent before a long-term stand-by period.

Examples 1, 2, 3, 4 of the cushion sheet 11 manufactured in accordance with the illustrated embodiment and comparative examples 1, 2 will hereafter be explained.

For each of examples 1 to 4, the cushion sheet 11 was manufactured in the following manner. More specifically, the sheet body 12 was formed by cutting a urethane foam sheet with a thickness of 2.5 millimeters (product number EL-67F) of INOAC CORPORATION in accordance with the length of 1,300 millimeters and the width of 320 millimeters. The sheet body 12 was then mounted on a transport roller conveyor that operated at the speed of 30 meters per minute. Meanwhile, the manufacturing apparatus of the illustrated embodiment was actuated. The polyurethane hot-melt moisture curing resin (diphenyl methane diisocyanate, MDI type, product number: YR067) of HITACHI KASEI POLYMER CO., LTD. was then ejected together with the heated air at 130 degrees Celsius through the nozzles. The resin was thus bonded with the sheet body 12 in a state resembling a spread cloth while the sheet body 12 was being transported. In each example 1, 2, 3, 4, the nozzle holes 27 were maintained in non-contact states with respect to the sheet body 12. Application of the material of the synthetic resin fibers 13 was performed in accordance with a constant width.

The cushion sheet of comparative example 1 had a sheet body identical to those of examples 1 to 4. The polyurethane hot-melt moisture curing resin was product number YR067 of HITACHI KASEI POLYMER CO., LTD. and was applied on a surface of the sheet body in accordance with a coating weight of 10 g/m² using a coating coat applicator (product number: BC62) of NORDSON KK. Coating coat refers to a technique in which hot-melt adhesive is pressed against a target by a T die. In the coating coat, for example, the distance between the distal end of the T die and the target, the viscosity of the resin, or the displacement were controlled. In this manner, the pattern for applying the viscous hot-melt resin was modified from a linear shape to a broken-line-like shape, thus forming a low-friction layer.

The cushion sheet of comparative example 2 had a sheet body identical to those of examples 1 to 4. A tricot knit formed of nylon (product of KABUSHIKI KAISHA KIRYU TRICOT, product number: 15d) was bonded with a surface of the sheet body as a back lining.

Examples 1 to 4 and comparative examples 1, 2 were mounted on base materials 1 to 4. Using the friction test method according to ISO 8295 (JIS K 7125), the static and dynamic friction coefficients of the bonding surface of the synthetic resin fibers 13 of the cushion sheet 11 of each example 1, 2, 3, 4, the spray coating surface of comparative example 1, and the tricot knit bonding surface of comparative example 2 were determined relative to each base material 1, 2, 3, 4. The base materials 1 to 4 were formed as follows.

Base Material 1: melamine resin coated plywood

Base Material 2: foam body for vehicle seats formed of highly elastic polyurethane molding with the density of 0.047 g/cm³

Base Material 3: foam body for vehicle seats formed of highly elastic polyurethane molding with the density of 0.028 g/cm³

Base Material 4: foam body for vehicle seats formed of polyurethane hot molding with the density of 0.024-0.030 g/cm³

Table 1 shows the obtained measurements. The coating weight for each of examples 1 to 4 represents the application amount of the synthetic resin fibers 13. For example, a coating weight 10 corresponds to 10 g/cm³.

In addition, in each of examples 1, 2, 3, 4, the diameters of some of the synthetic resin fibers 13 adhered to the sheet body 12 were measured. Specifically, using a 50-power microscope, the minimum value, the maximum value and the average value of the diameters of arbitrarily selected thirty synthetic resin fibers 13 were measured. The measurement results are shown in Table 1.

TABLE 1

|  | Comparative Example 1 Coating | Comparative Example 2 Currently Employed Back Lining | Example 1 | Example 2 | Example 3 | Example 4 |
|---|---|---|---|---|---|---|
|  |  |  | Coating Weight | | | |
|  | coat | 15d Tricot | 10 | 15 | 20 | 30 |
| Base 1 Static/Dynamic | 0.41/0.41 | 0.57/0.51 | 0.30/0.29 | 0.19/0.18 | 0.20/0.19 | 0.20/0.17 |
| Base 2 Static/Dynamic | 1.80/1.74 | 0.80/0.84 | 0.74/0.69 | 0.48/0.45 | 0.50/0.48 | 0.45/0.41 |
| Base 3 Static/Dynamic | 0.82/0.79 | 0.91/0.96 | 0.61/0.65 | 0.50/0.45 | 0.57/0.41 | 0.61/0.62 |
| Base 4 Static/Dynamic | 1.15/1.08 | 0.77/0.78 | 0.72/0.72 | 0.60/0.60 | 0.59/0.59 | 0.53/0.52 |
| Minimum (μm) | — | — | 17 | 17 | 33 | 38 |
| Average (μm) | — | — | 72 | 174 | 166 | 136 |
| Maximum (μm) | — | — | 212 | 393 | 513 | 549 |

As indicated by Table 1, with each of the base materials 1 to 4, examples 1 to 4 showed lower static and dynamic friction coefficients than comparative examples 1, 2. That is, examples 1 to 4 exhibited improved smoothness compared to comparative examples 1, 2.

Further, in examples 1 and 2, the minimum value, the average value, and the maximum value of the synthetic resin fibers 13 are all in a range of 15 to 400 micrometers. Therefore, examples 1 and 2 exhibit a comparable level of smoothness as that of examples 3 and 4 while using a less amount of synthetic resin material than examples 3 and 4, in which the maximum value of the diameters of the synthetic resin fibers 13 exceeded 400 micrometers. Thus, examples 1 and 2 reduce the manufacture costs compared to examples 3 and 4, and facilitate the bonding process with synthetic resin.

The present examples and embodiments are to be considered as illustrative and not restrictive and the invention is not to be limited to the details given herein, but may be modified within the scope and equivalence of the appended claims.

The invention claimed is:

1. A seat cover comprising:
   a cushion sheet including a sheet body and a low-friction layer formed on the sheet body; and
   a fibrous sheet formed on the surface opposite to the surface corresponding to the low-friction layer;
   wherein the sheet body is formed of porous material; and
   wherein the low-friction layer is formed by applying a plurality of synthetic resin fibers to the surface of the sheet body in a non-uniform manner.

2. The seat cover according to claim 1, wherein the diameters of the synthetic resin fibers are in a range of 10 to 600 micrometers.

3. The seat cover according to claim 1, wherein the diameters of the synthetic resin fibers are in a range of 15 to 400 micrometers.

4. The seat cover according to claim 1, wherein the amount of the synthetic resin fibers bonded with the surface of the sheet body is in a range of 5 to 100 grams per square meter of the sheet body.

5. The seat cover according to claim 1, wherein the amount of the synthetic resin fibers bonded with the surface of the sheet body is in a range of 10 to 40 grams per square meter of the sheet body.

6. The seat cover according to claim 1, wherein the synthetic resin fibers extend and curve on the sheet body.

7. The seat cover according to claim 1, wherein the synthetic resin fibers are arranged with clearances between adjacent ones of the synthetic resin fibers.

8. The seat cover according to claim 1, wherein the synthetic resin fibers are formed of a moisture curing resin.

* * * * *